United States Patent
Takagi et al.

(10) Patent No.: US 9,416,852 B2
(45) Date of Patent: Aug. 16, 2016

(54) AUTOMATIC TRANSMISSION FOR VEHICLE

(71) Applicant: AISIN SEIKI KABUSHIKI KAISHA, Kariya-shi, Aichi-ken (JP)

(72) Inventors: Kiyoharu Takagi, Okazaki (JP); Atsuhiro Mase, Aichi-ken (JP); Hideki Nakamura, Nagoya (JP)

(73) Assignee: AISIN SEIKI KABUSHIKI KAISHA, Kariya-Shi, Aichi-Ken (JP)

(*) Notice: Subject to any disclaimer, the term of this patent is extended or adjusted under 35 U.S.C. 154(b) by 0 days.

(21) Appl. No.: 14/630,173

(22) Filed: Feb. 24, 2015

(65) Prior Publication Data

US 2015/0247556 A1    Sep. 3, 2015

(30) Foreign Application Priority Data

Feb. 28, 2014   (JP) .................................. 2014-038950

(51) Int. Cl.
*F16H 3/62*   (2006.01)
*F16H 3/66*   (2006.01)

(52) U.S. Cl.
CPC .......... *F16H 3/66* (2013.01); *F16H 2200/0069* (2013.01); *F16H 2200/201* (2013.01); *F16H 2200/2012* (2013.01); *F16H 2200/2046* (2013.01); *F16H 2200/2064* (2013.01)

(58) Field of Classification Search
None
See application file for complete search history.

(56) References Cited

U.S. PATENT DOCUMENTS

| | | | |
|---|---|---|---|
| 7,131,926 B2 | 11/2006 | Tiesler et al. | |
| 7,686,730 B2* | 3/2010 | Baldwin | F16H 3/66 475/276 |
| 7,828,688 B2 | 11/2010 | Phillips et al. | |
| 8,177,677 B2* | 5/2012 | Samie | F16H 3/663 475/281 |
| 2009/0017979 A1 | 1/2009 | Phillips et al. | |
| 2010/0234167 A1* | 9/2010 | Lee | F16H 3/66 475/285 |
| 2012/0108382 A1* | 5/2012 | Saitoh | F16H 3/66 475/276 |
| 2012/0108383 A1* | 5/2012 | Saitoh | F16H 3/66 475/276 |
| 2012/0295756 A1* | 11/2012 | Lee | F16H 3/66 475/289 |

* cited by examiner

*Primary Examiner* — Sherry Estremsky
*Assistant Examiner* — Lillian Nguyen
(74) *Attorney, Agent, or Firm* — Buchanan Ingersoll & Rooney PC

(57) ABSTRACT

An automatic transmission for a vehicle includes a housing, three single pinion type planetary gear mechanisms being supported by the housing, an input shaft supported by the housing and connected to a first carrier, an output shaft connected to a third carrier, a brake, a first clutch selectively connecting the first carrier and a second sun gear, a second clutch, a third clutch, a fourth clutch, and a switching clutch. The switching clutch selectively switches positions to a position where a third ring gear is fixed to the housing, a position where a second carrier is fixed to the housing, or a position where the third ring gear and the second carrier are released relative to the housing. The first clutch connects the first carrier and the second sun gear, and the switching clutch fixes the second carrier to the housing when establishing a reverse speed.

3 Claims, 6 Drawing Sheets

|  | CL1 | CL2 | CL3 | CL4 | B1 | D1 |
|---|---|---|---|---|---|---|
| 1st |  | ○ | ○ |  |  | c |
| 2nd | ○ | ○ |  |  |  | c |
| 3rd |  | ○ |  |  | ○ | c |
| 4th |  | ○ |  | ○ |  | c |
| 5th |  | ○ |  | ○ | ○ | b |
| 6th | ○ | ○ |  | ○ |  | b |
| 7th | ○ |  |  | ○ | ○ | b |
| 8th |  |  | ○ | ○ | ○ | b |
| 9th | ○ |  | ○ |  | ○ | b |
| 10th |  | ○ | ○ |  | ○ | b |
| Rev | ○ |  |  |  |  | a |

|      | CL1 | CL2 | CL3 | CL4 | B1 | D1 |
|------|-----|-----|-----|-----|----|----|
| 1st  |     | ○   | ○   |     |    | c  |
| 2nd  | ○   | ○   |     |     |    | c  |
| 3rd  |     | ○   |     |     | ○  | c  |
| 4th  |     | ○   |     | ○   |    | c  |
| 5th  |     | ○   |     | ○   | ○  | b  |
| 6th  | ○   | ○   |     | ○   |    | b  |
| 7th  | ○   |     |     | ○   | ○  | b  |
| 8th  |     |     | ○   | ○   | ○  | b  |
| 9th  | ○   |     | ○   |     | ○  | b  |
| 10th |     | ○   | ○   |     | ○  | b  |
| Rev  | ○   |     |     |     |    | a  |

FIG. 7
Prior Art

|      | CL11 | CL12 | CL13 | CL14 | B11 | B12 |
|------|------|------|------|------|-----|-----|
| 1st  |      | ○    | ○    |      |     | ○   |
| 2nd  | ○    | ○    |      |      |     | ○   |
| 3rd  |      | ○    |      |      | ○   | ○   |
| 4th  |      | ○    |      | ○    |     | ○   |
| 5th  |      | ○    |      | ○    | ○   |     |
| 6th  | ○    | ○    |      | ○    |     |     |
| 7th  | ○    |      |      | ○    | ○   |     |
| 8th  |      |      | ○    | ○    | ○   |     |
| 9th  | ○    |      | ○    |      | ○   |     |
| 10th |      | ○    | ○    |      | ○   |     |
| Rev  | ○    |      |      | ○    |     | ○   |

F I G. 10
Prior Art

|      | CL11 | CL12 | CL13 | CL14 | B11 | B12 |
|------|------|------|------|------|-----|-----|
| 1st  |      | ○    | ○    |      |     | ○   |
| 2nd  | ○    | ○    |      |      |     | ○   |
| 3rd  |      | ○    |      |      | ○   | ○   |
| 4th  |      | ○    |      | ○    |     | ○   |
| 5th  |      | ○    |      | ○    | ○   |     |
| 6th  | ○    | ○    |      | ○    |     |     |
| 7th  | ○    |      |      | ○    | ○   |     |
| 8th  |      |      | ○    | ○    | ○   |     |
| 9th  | ○    |      | ○    |      | ○   |     |
| 10th |      | ○    | ○    |      | ○   |     |
| Rev  |      |      | ○    | ○    |     | ○   |

AUTOMATIC TRANSMISSION FOR VEHICLE

CROSS REFERENCE TO RELATED APPLICATIONS

This application is based on and claims priority under 35 U.S.C. §119 to Japanese Patent Application 2014-038950, filed on Feb. 28, 2014, the entire content of which is incorporated herein by reference.

TECHNICAL FIELD

This disclosure generally relates to an automatic transmission for a vehicle.

BACKGROUND DISCUSSION

Known automatic transmissions disclosed in U.S. Pat. No. 7,828,688B and U.S. Pat. No. 7,131,926B (hereinafter referred to as Patent references 1 and 2, respectively) include three single pinion type planetary gear mechanisms and six engaging elements including two brakes and four clutches, and establish ten forward speeds and one reverse speed by the engagement of three elements among six engaging elements. As illustrated in FIG. 6, first to third planetary gear mechanisms P11-P13 are arranged in the mentioned order in a row from an input shaft N side to an output shaft T side. Elements that structure the first to third planetary gear mechanisms P11-P13 are referred to as first to third carriers C11-C13 that rotatably support first to third pinions Q11-Q13, respectively, first to third sun gears S11-S13, and first to third ring gears R11-R13, respectively.

The second carrier C12 is connected to the input shaft N. The second ring gear R12 is connected to the third sun gear S13. The second sun gear S12 is selectively fixed to a housing H by a first brake B11 and is selectively connected to the first sun gear S11 by a second clutch CL12. The second carrier C12 is selectively connected to the first sun gear S11 by a first clutch CL11.

The second ring gear R12 is selectively connected to the first carrier C11 by a third clutch CL13. The first ring gear R11 is connected to the third carrier C13. The first carrier C11 is selectively connected to the third ring gear R13 by a fourth clutch CL14. The third ring gear R13 is selectively fixed to the housing H by a second brake B12. The third carrier C13 is connected to the output shaft T.

FIG. 7 shows operation states of clutches CL11 to CL14 and brakes B11 and B12, the operation states corresponding to respective speed stages. A circle provided in FIG. 7 indicates that the element is actuated (the element is in an ON state). FIG. 8 shows a velocity diagram in which the sun gears S11 to S13, the carriers C11 to C13, and the ring gears R11 to R13 that are elements for structuring the first to third planetary gear mechanisms P11-P13 when establishing a reverse speed, or reverse speed stage are arranged with intervals corresponding to gear ratios $\lambda 1$-$\lambda 3$ in a lateral axis direction, and rotation speed ratios corresponding to the elements are arranged in a vertical direction.

Further, for example, an automatic transmission disclosed in US2009-0017979A includes a modified construction by an addition of one single pinion type planetary gear mechanism to the automatic transmission for vehicle disclosed in Patent reference 1. That is, the automatic transmission disclosed in Patent reference 3 includes four single pinion type planetary gear mechanisms and six engaging elements including two brakes and four clutches, and establish ten forward speeds and one reverse speed by the engagement of three elements among six engaging elements.

According to an automatic transmission 20 for vehicle disclosed in Patent reference 3 and disclosed in FIG. 9, the same numeral is applied to the component common to the automatic transmission 10 for vehicle of Patent reference 1 shown in FIG. 6, and detailed explanations of the components are not repeated here. As shown in FIG. 9, according to the construction of the automatic transmission 20 for vehicle, a fourth planetary gear mechanism P14 is additionally disposed between the first planetary gear mechanism P11 and the second planetary gear mechanism P12. Hereinafter, each of elements that structures the fourth planetary gear mechanism P14 is referred to as a fourth carrier C14 rotatably supporting a fourth pinion Q14, a fourth sun gear S14, and a fourth ring gear R14.

The fourth sun gear S14 is connected to the second carrier C12. The fourth ring gear R14 is selectively connected to the second ring gear R12 by the third clutch CL13, and is selectively connected to the first ring gear R11 by the first clutch CL11. The fourth carrier C14 is connected to the first carrier C11.

FIG. 10 shows operation states of clutches CL11 to CL 14 and brakes B11 and B12, the operation states corresponding to respective speed stages. A circle provided in FIG. 10 indicates that the element is actuated (the element is in an ON state).

As shown in FIG. 8, according to the automatic transmission 10 for vehicle disclosed in Patent references 1 and 2, when establishing a reverse speed, the first clutch CL11 is operated to be in an ON state so that a rotation drive force of the input shaft N is inputted to the first sun gear S11. Further, drive force for reverse rotation is generated at the first ring gear R11 by the connection of the first carrier C11 and the third ring gear R13 by the actuation of the fourth clutch CL14, and by the fixing of the first carrier C11 by the actuation of the second brake B12. The drive force for reverse rotation of the first ring gear R11 is outputted to the output shaft T via the third carrier C13. That is, according to the automatic transmission 10 for vehicle, the drive force for reverse rotation is generated only by the input to the first planetary gear mechanism P11 and the braking operation for the first planetary gear mechanism P11.

Then, because the third ring gear R13 is fixed and the third carrier C13 rotates in a reverse direction, the third sun gear S13 passively rotates in the reverse direction at speed faster than the third carrier C13. Further, because the second ring gear R12 is connected to the third sun gear S13, the second ring gear R12 rotates in the reverse direction. Because the rotation of the input shaft N is inputted to the second carrier C12, the second sun gear S12 comes to rotate at the high speed. That is, a rotation speed ratio of the second sun gear S12 corresponds to a value H that is calculated by the reduction of an output rotation speed ratio from a value obtained by multiplying the reciprocal of the gear ratio $\lambda 2$ (=the number of teeth of the second sun gear S12/the number of teeth of the second ring gear R12) and the sum of the output rotation speed ratio and an input rotation speed ratio. Similarly, according to the automatic transmission 20 disclosed in Patent reference 3 (FIG. 9), the second sun gear S12 comes to rotate at the high speed.

Thus, the second clutch CL12 that selectively engages the second sun gear S12 with the first sun gear S11 and the first brake B11 may be susceptible to the generation of the burning because a relative rotation speed is increased. Further, the durability of a bearing or the like that supports the second sun gear S12 declines significantly. In a case where an oil passage is formed at a shaft connected to the second sun gear S12, the durability of a sealing disposed on the shaft may be declined.

A need thus exists for an automatic transmission for a vehicle which is not susceptible to the drawback mentioned above.

SUMMARY

In light of the foregoing, the disclosure provides an automatic transmission for a vehicle, which includes a housing; three single pinion type planetary gear mechanisms including a first planetary gear mechanism having a first sun gear, a first ring gear, and a first carrier, a second planetary gear mechanism having a second sun gear, a second ring gear, and a second carrier, and a third planetary gear mechanism having a third sun gear, a third ring gear, and a third carrier, the first ring gear and the third sun gear being connected to each other, the second ring gear and the third carrier being connected to each other, said three single pinion type planetary gear mechanisms being supported by the housing and being coaxial to a rotation axis; an input shaft supported by the housing to be rotatable about the rotation axis, the input shaft connected to the first carrier of the first planetary gear mechanism; an output shaft supported by the housing to be rotatable about the rotation axis, the output shaft connected to the third carrier of the third planetary gear mechanism; a brake selectively fixing and releasing the first sun gear of the first planetary gear mechanism to and from the housing; a first clutch selectively connecting the first carrier and the second sun gear of the second planetary gear mechanism; a second clutch selectively connecting the first sun gear of the first planetary gear mechanism and the second sun gear of the second planetary gear mechanism; a third clutch selectively connecting the second carrier of the second planetary gear mechanism and the third sun gear of the third planetary gear mechanism; a fourth clutch selectively connecting the third ring gear of the third planetary gear mechanism and the second carrier of the second planetary gear mechanism; and a switching clutch selectively switching positions to a position where the third ring gear is fixed to the housing, a position where the second carrier is fixed to the housing, or a position where the third ring gear and the second carrier are released relative to the housing. When establishing a reverse speed, the first clutch connects the first carrier and the second sun gear, and the switching clutch fixes the second carrier to the housing.

BRIEF DESCRIPTION OF THE DRAWINGS

The foregoing and additional features and characteristics of this disclosure will become more apparent from the following detailed description considered with the reference to the accompanying drawings, wherein:

FIG. 7 shows operation states of brakes and clutches at respective speed stages according to the known automatic transmission;

FIG. 10 shows operation states of brakes and clutches at respective speed stages according to the mentioned another known automatic transmission.

DETAILED DESCRIPTION

Figures 1, 2:
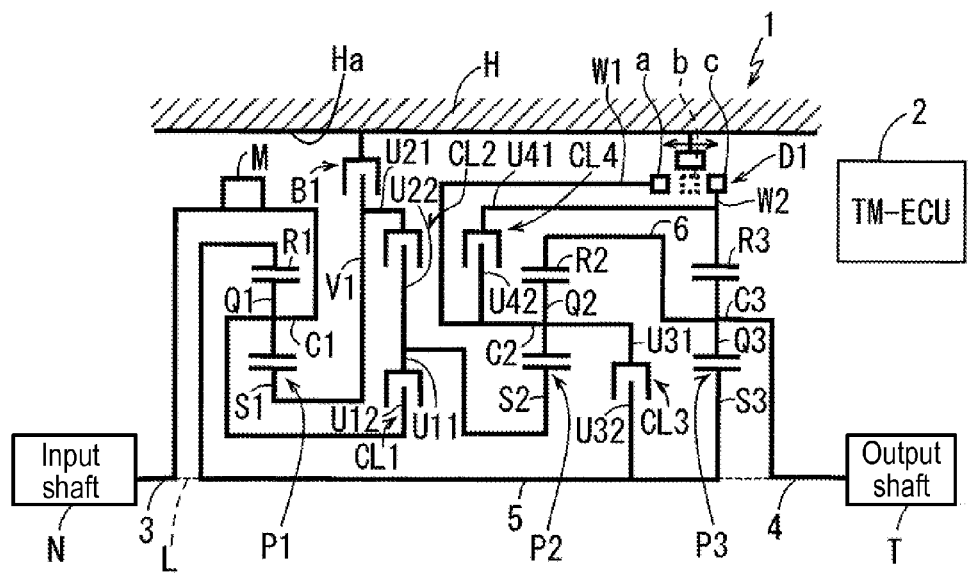
FIG. 1 is a schematic diagram of an automatic transmission according to a first embodiment disclosed here.
FIG. 2 shows operation states of brakes and clutches at respective speed stages according to the first embodiment disclosed here.

Embodiments of an automatic transmission for a vehicle will be described with reference to illustrations of drawing figures as follows. The automatic transmission for the vehicle is applied as a device for changing the speed of a rotation drive force outputted from an engine which is mounted to the vehicle. The rotation drive force of which the speed is changed by the automatic transmission for the vehicle is transmitted to driving wheels via a differential device, for example, and the vehicle moves forwards or backwards at a predetermined speed stage that is established by the automatic transmission for the vehicle.

An automatic transmission 1 for a vehicle according to a first embodiment will be explained with reference to FIG. 1. The automatic transmission 1 for the vehicle includes three single pinion type planetary gear mechanisms P1-P3 (first to third planetary gear mechanisms P1-P3), four clutches CL1-CL4 (first to fourth clutches CL1-CL4), a brake B1, a switching clutch D1, members 5, 6 connecting predetermined elements, members U11, U21, U31, U12, U22, U32, U41, U42 that connect clutches CL1-CL4 and predetermined elements, a member (brake connection member) V1 for connecting the brake B1 and a predetermined element, members W1, W2 for fixing the switching clutch D1 to a predetermined element, an input shaft N, and an output shaft T. Three single pinion type planetary gear mechanisms P1-P3 are arranged in a direction of an axis from an input side (i.e., left-hand side in FIG. 1; input shaft side; a side closer to the input shaft) towards an output side (i.e., right-hand side in FIG. 1; output shaft side; side closer to the output shaft). The first to fourth clutches CL1-CL4 selectively connect elements that construct each of the planetary gear mechanisms P1-P3. The brake B1 selectively engages a predetermined element to a housing H. The switching clutch D1 is configured to switch positions of a predetermined element to a position where the predetermined element is selectively fixed to the housing H or a position where the predetermined element is free relative to the housing H, or not connected to the housing H (the switching clutch D1 switches positions of a predetermined element to a position where the predetermined element is fixed to the housing H in a detachably manner or to a position where the predetermined element is free relative to the housing H, or is not connected to the housing H).

Further, according to the automatic transmission 1 for the vehicle, operation states of engaging elements including the first to fourth clutches CL1 to CL4, the brake B1, and the switching clutch D1 are controlled on the basis of control signals from a vehicle control ECU (electronic control unit) 2. According to the embodiment, by the actuation of three engaging elements or two engaging elements among the above described engaging elements including the first to fourth clutches CL1 to CL4, the brake B1, and the switching clutch D1, a speed of a rotation drive force inputted from the input shaft N is changed to one of ten forward speeds and one reverse speed to be outputted from the output shaft T. Details of the speed stages to be established and the operation states of the engaging elements according to the automatic transmission 1 for the vehicle will be described hereinafter.

The input shaft N and the output shaft T are supported by the housing H to be rotatable about a rotation axis L. The input shaft N is a shaft member that inputs the rotation drive force of the engine to the automatic transmission 1 for the vehicle via, for example, a clutch device. The output shaft T is disposed coaxially to the input shaft N and outputs the rotation drive force with changed speed to driving wheels via a differential device, for example.

Each of the planetary gear mechanisms P1 to P3 is a single pinion type planetary gear mechanism in which the pinion gears Q1 to Q3 that are rotatably supported by the carriers C1 to C3, respectively, are meshed with the sun gears S1 to S3 and the ring gears R1 to R3, respectively. The first to third planetary gear mechanisms P1 to P3 are arranged in the mentioned order from the input side. Elements of each of the planetary gear mechanisms P1 to P3 are defined as the first to third sun gears S1 to S3, the first to third carriers C1 to C3, and the first to third ring gears R1 to R3, respectively.

The first planetary gear mechanism P1 includes the first sun gear S1 rotatably supported to be coaxial to the rotation axis L, the first ring gear R1, and the first carrier C1 that rotatably supports the first pinion gear Q1 that is meshed with the first sun gear S1 and the first ring gear R1.

The second planetary gear mechanism P2 includes the second sun gear S2 rotatably supported to be coaxial to the rotation axis L, the second ring gear R2, and the second carrier C2 that rotatably supports the second pinion gear Q2 that is meshed with the second sun gear S2 and the second ring gear R2.

The third planetary gear mechanism P3 includes the third sun gear S3 rotatably supported to be coaxial to the rotation axis L, the third ring gear R3, and the third carrier C3 that rotatably supports the third pinion gear Q3 that is meshed with the third sun gear S3 and the third ring gear R3.

The brake B1 is an engaging element provided at the housing H and braking the rotation of the predetermined element. According to the embodiment, similar to the clutches C1 to C4, a hydraulic type brake that is actuated by a hydraulic pressure supplied from an oil passage formed on the housing H is applied the brake B1. Thus, the brake B1 brakes the rotation of the targeted predetermined element by applying pads to a disc upon the supply of the hydraulic pressure from a hydraulic pressure pump that actuates on the basis of a control command, for example, by the control ECU 2. Then, when the supply of the hydraulic pressure by the hydraulic pressure pump is blocked, the pads are released from the disc to allow the rotation of the predetermined element.

The switching clutch D1 is an engaging element provided at the housing H and for selecting the switching of positions (selectively switching positions) including a position where a first predetermined element is fixed to the housing H in a disengageable manner (a position where a first predetermined element is selectively fixed to the housing H), a position where second predetermined element is fixed to the housing H in a disengageable manner (a position where second predetermined element is selectively fixed to the housing H), and a position where the first and second predetermined elements are free relative to the housing H (the first and second predetermined elements are disengaged from the housing H). As the switching clutch D1, for example, a dog clutch, a wet clutch, or a synchromesh mechanism is applicable.

Each of the clutches CL1 to CL4 is an engaging element selectively connecting plural elements. According to the embodiment, a clutch which is normal open type and hydraulic pressure type that is actuated upon receiving the supplied hydraulic pressure is applied as each of the clutches CL1 to CL4. Thus, each of the clutches CL1 to CL4 makes plural clutch plates contact one another to connect the elements so that a drive force is transmitted between the targeted elements upon the supply of the hydraulic pressure from the hydraulic pressure pump that actuates on the basis of the control command, for example, by the control ECU 2 via oil passages formed on the input shaft N and the housing H. Then, when the supply of the hydraulic pressure by the hydraulic pressure pump is blocked, the clutch plates are separated and the elements are disengaged from each other so that the drive force is not transmitted between the targeted elements.

The input shaft N is connected to the first carrier C1 via an input shaft connection member 3 that extends in the axial direction passing through an outer side relative to the first ring gear R1. The input shaft connection member 3 is provided with a power take off member M for taking out the power to the outside.

The output shaft T is connected to the third carrier C3 via an output shaft connection member 4.

The first ring gear R1 and the third sun gear S3 are connected via a first gear connection member 5 that extends in the axial direction passing through an inner side relative to the first sun gear S1.

The second ring gear R2 and the third carrier C3 are connected via a second gear connection member 6.

The brake B1 brakes the rotation of the first sun gear S1 connected to the brake connection member V1 via the brake connection member V1.

The switching clutch D1 switches positions to a position a where the second carrier C2 that is connected to a first switching clutch connection member W1 is fixed to the housing H in a disengageable manner, a position c where the third ring gear R3 that is connected to a second switching clutch connection member W2 is fixed to the housing H in a disengageable manner, and a position b where the second carrier C2 and the third ring gear R3 are free relative to the housing H (the second carrier C2 and the third ring gear R3 are in released state relative to the housing H).

The first clutch CL1 is connected to the second sun gear S2 via a first portion U11 of a first-clutch connection member, and the first clutch CL1 selectively connects the first carrier C1 and the second sun gear S2 via a second portion U12 of the first-clutch connection member that extends in the axial direction passing through an inner side relative to the first sun gear S1. The first carrier C1 is connected to the input shaft connection member 3 at the output shaft side of the input shaft connection member 3 (at the side closer to the output shaft T of the input shaft connection member 3). The first carrier C1 is connected to the second portion U12 of the first-clutch connection member at the input shaft side of the second portion U12 of the first-clutch connection member (at the side closer to the input shaft N of the second portion U12 of the first-clutch connection member).

The second clutch CL2 is connected to the brake connection member V1 via a first portion U21 of a second-clutch connection member, and selectively connects the first sun gear S1 and the second sun gear S2 via a second portion U22 of the second-clutch connection member and the first portion U21 of the second-clutch connection member.

The third clutch CL3 is connected to the second carrier C2 via a first portion U31 of a third-clutch connection member, and the third clutch CL3 selectively connects the first ring gear R1 and the third sun gear S3, and the second carrier C2 via a second portion U32 of the third-clutch connection member that is connected to the first gear connection member 5.

The fourth clutch CL4 is connected to the third ring gear R3 via a first portion U41 of a fourth-clutch connection member, and the fourth clutch CL4 selectively connects the second carrier C2 and the third ring gear R3 via a second portion U42 of the fourth-clutch connection member that is connected to the first switching clutch connection member W1. The second portion U42 of the fourth-clutch connection member is connected to the second carrier C2 at the input shaft side of the second portion U42 of the fourth-clutch connection member (at the side closer to the input shaft N of the second portion U42 of the fourth-clutch connection member).

According to the automatic transmission 1 having the construction described above, ten forward speeds and one reverse speed can be established by the restriction of the rotation of the elements of the first to third planetary gear mechanisms P1 to P3 by the selective actuation of the first to fourth clutches CL1 to CL4, the brake B1 and the switching clutch D1. FIG. 2 shows the operation states of the first to fourth clutches CL1 to CL4, the brake B1, and the switching clutch D1 corresponding respective speed stages. A circle marked in FIG. 2 indicates that the selected clutch or the brake is in an ON state (actuated state). The indication of a or c in a column for the switching clutch D1 indicates that the switching clutch D1 is in an ON state (actuated state).

Thus, the automatic transmission 1 for the vehicle is configured to establish speed stages having different speed ratios from one another by the selective actuations of three engaging elements among six engaging elements. Further, the automatic transmission 1 for the vehicle is configured so that a speed stage is transited to an adjacent speed stage by the switching of one of three engaging elements that is to be actuated (ON state).

Generally, according to a single pinion type planetary gear mechanism, relationships of sun gear rotation speed Ns, carrier rotation speed Nc, ring gear rotation speed Nr, and a gear ratio λ of the planetary gear mechanism is described as Equation 1. The gear ratio at each shift stage (speed) is calculated on the basis of Equation 1. Provided that the numbers of teeth of the first to third sun gears S1-S3 of the first to third planetary gear mechanisms P1-P3 are defined as Zs1-Zs3 and the numbers of teeth of the first to third ring gears R1-R3 are defined as Zr1-Zr3, the gear ratios λ1-λ3 of the first to third planetary gear mechanisms P1-P3 are defined as follows: λ1=Zs1/Zr1, λ2=Zs2/Zr2, λ3=Zs3/Zr3.

$$Ns=(1+1/\lambda)\cdot Nc-1/\lambda\cdot Nr \qquad \text{Equation 1:}$$

Here, a velocity diagram shown in FIG. 3 will be explained as follows. Because a single pinion type planetary gear mechanism is applied as the first planetary gear mechanism P1, a distance between the vertical line for the first sun gear S1 and the vertical line for the first carrier C1 is defined as one (1), and the vertical line for the first ring gear R1 is positioned at the position opposite from the vertical line for the first sun gear S1 relative to the vertical line for the first carrier C1, the vertical line for the first ring gear R1 positioned being away from the vertical line for the first carrier C1 by a distance λ1. Because a single pinion type planetary gear mechanism is applied as the second planetary gear mechanism P2, a distance between the vertical line for the second sun gear S2 and the vertical line for the second carrier C2 is defined as one (1), and the vertical line for the second ring gear R2 is positioned opposite from the vertical line for the second sun gear S2 relative to the vertical line for the second carrier C2, the vertical line for the second ring gear R2 positioned being away from the vertical line for the second carrier C2 by a distance λ2. Because a single pinion type planetary gear mechanism is applied as the third planetary gear mechanism P3, a distance between the vertical line for the third sun gear S3 and the vertical line for the third carrier C3 is defined as one (1), and the vertical line for the third ring gear R3 is positioned opposite from the vertical line for the third sun gear S3 relative to the vertical line for the third carrier C3, the vertical line for the third ring gear R3 positioned being away from the vertical line for the third carrier C3 by a distance λ3.

Figure 8:
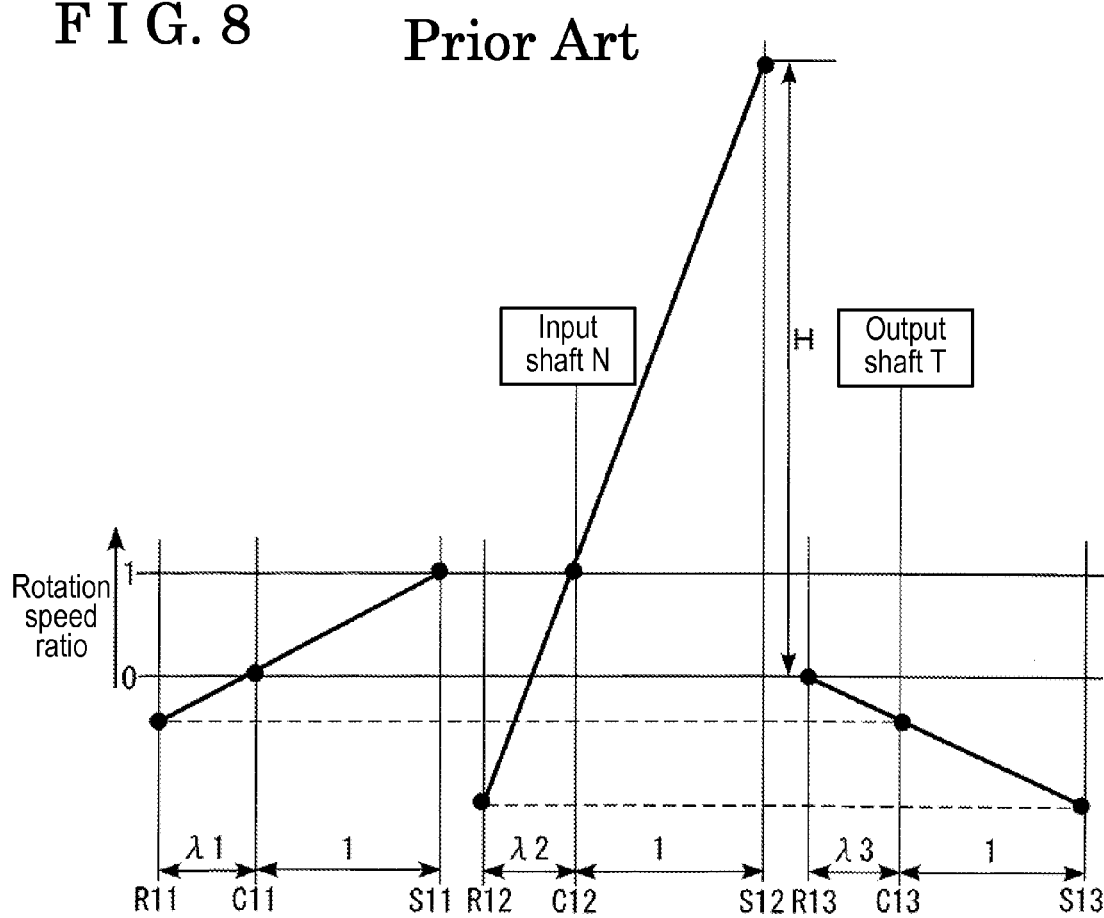
FIG. 8 shows a velocity diagram showing a rotation speed ratio of each element that structures a planetary gear mechanism when a reverse speed is established according to the known automatic transmission.
Figure 9:
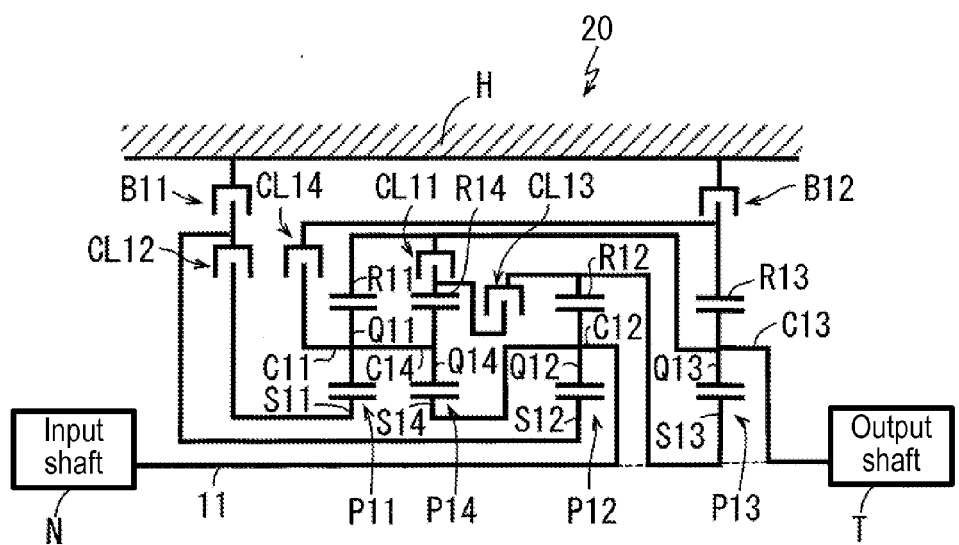
FIG. 9 is a schematic diagram of another known automatic transmission.

As described in Background Discussion, as illustrated in FIG. 8, according to the known automatic transmission 10 for vehicle, because the second sun gear S12 comes to rotate at high speed (with rotation speed ratio H) when establishing reverse speed stage, a relative rotation speed of the first brake B11 and the second clutch CL12 is increased and the first brake B11 and the second clutch CL12 are susceptible to the generation of the burning.

Figure 3:
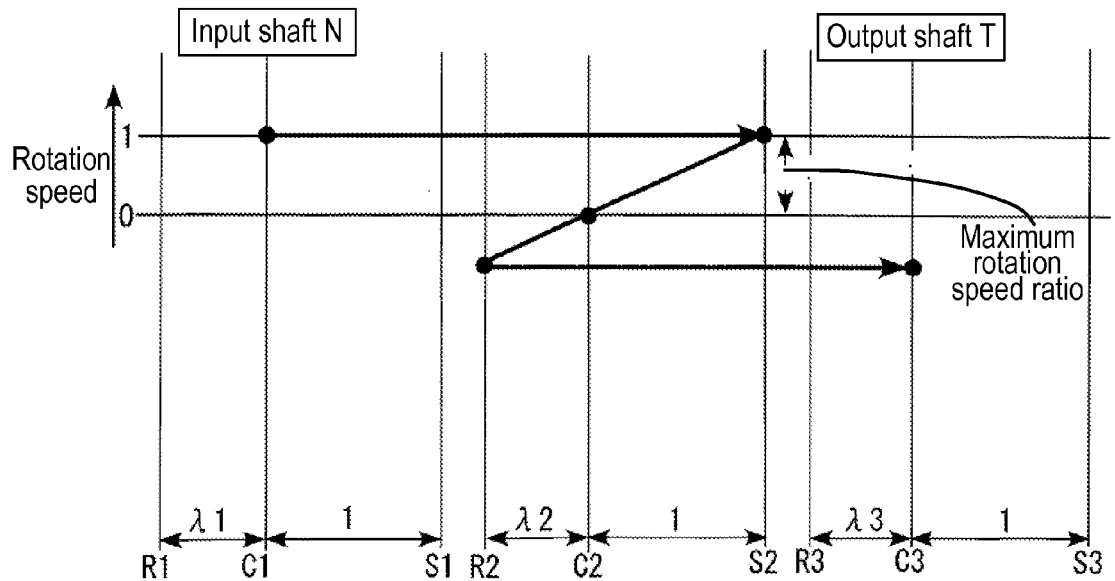
FIG. 3 shows a velocity diagram showing a rotation speed ratio of each element that structures a planetary gear mechanism when a reverse speed is established according to the first embodiment disclosed here.

However, according to the automatic transmission 1 for the vehicle of the embodiment, as illustrated in FIGS. 2-3, when establishing the reverse speed, the switching clutch D1 is shifted to the position a to fix the second carrier C2 and the first clutch CL1 is actuated (assumed to be ON state) to connect the first carrier C1 and the second sun gear S2 to produce a drive force for reverse rotation at the second ring gear R2. The drive force for reverse rotation is outputted to the output shaft T via the third carrier C3.

In those circumstances, because the first carrier C1 and the second sun gear S2 are connected to the input shaft N, the first carrier C1 and the second sun gear S2 rotate at an input rotation speed. Further, the second ring gear R2 and the third carrier C3 are rotated in reverse directions by the second planetary gear mechanism P2, the second carrier C2 is fixed by means of the switching clutch D1, and the first ring gear R1 and the third sun gear S3 rotate freely without any restriction by a particular rotation (rotation of particular component). Thus, the rotation speed of the first sun gear S1 is not forced to increase.

For example, an input rotation speed ratio is set at 1.0, an output rotation speed ratio for a reverse speed is set at −0.4 (because the sun gear of the planetary gear mechanism is positioned radially inward of the ring gear, the number of teeth for the sun gear is smaller than the number of teeth for the ring gear, and λ is smaller than one (λ<1)), the gear ratio λ2 for the second planetary gear mechanism P2 is set at 0.4, and the gear ratio λ3 for the third planetary gear mechanism P3 is set at 0.4. Whereas the rotation speed ratio H for the second sun gear S12 for the automatic transmission 10 according to the known disclosure is assumed to be 7.0, the maximum rotation speed ratio for the second sun gear S2 of the automatic transmission 1 according to the embodiment is assumed to be 1.0. Accordingly, the rotation of the second sun gear S2 does not reach at high speed.

According to the automatic transmission 1 of the first embodiment, because a relative rotation speed of the brake B1 is not assumed to be large, the brake B1 that selectively engages the first sun gear S1 with the housing H is restrained from generating the burning. Further, durability of a bearing, for example, that supports the first sun gear S1 is enhanced. Further, in a case where an oil passage is formed in a shaft that is connected to the first sun gear S1, durability of a sealing that is provided on the shaft is enhanced. Still further, because of the application of the switching clutch D1, in a case where the third ring gear R3 is not fixed to the housing H when one of fifth to tenth speed stages is established, dragging by brake discs can be eliminated, and thus efficiency in the transmission can be enhanced.

A second embodiment of the automatic transmission for the vehicle will be explained as follows. An automatic transmission 11 for vehicle according to the second embodiment includes a construction that a fourth planetary gear mechanism P4 is additionally provided between the first planetary gear mechanism P1 and the second planetary gear mechanism P2 of the automatic transmission 1 for the vehicle of the first embodiment. Basically, connections of connection portions, clutches, and a brake are common to the first embodiment. The same numerals are applied to the same components of the automatic transmission 1 for the vehicle of the first embodiment, and the explanations for those components will not be repeated. Components which are particular to the second embodiment will be explained referring to FIGS. 4 and 5.

Figure 4:
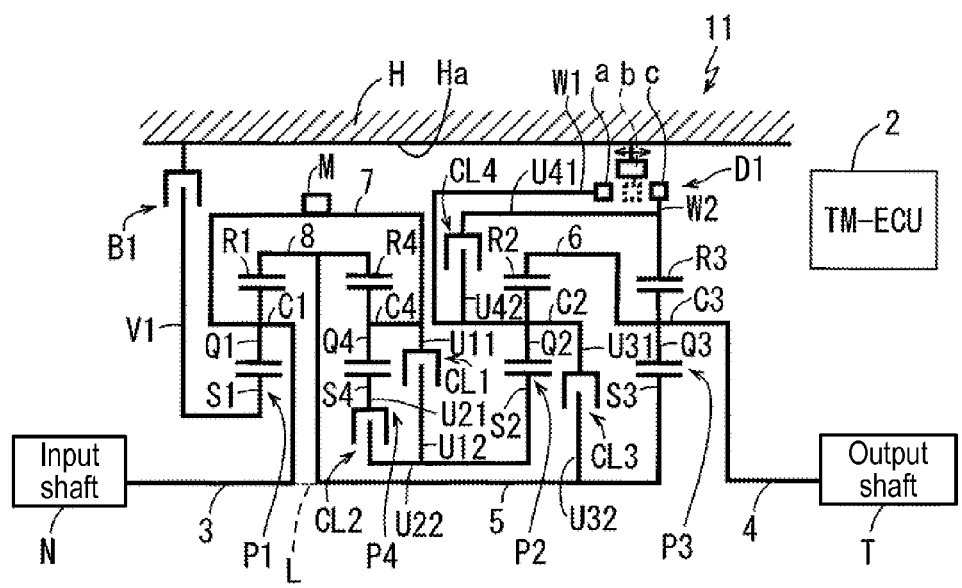
FIG. 4 is a schematic diagram of an automatic transmission according to a second embodiment disclosed here.

As illustrated in FIG. 4, according to the automatic transmission 11 for the vehicle of the second embodiment, the fourth sun gear S4 is selectively connected to the second sun gear S2 (the fourth sun gear S4 is engageable with and disengageable from the second sun gear S2) via the second clutch CL2. The fourth carrier C4 is connected to the first carrier C1 via a carrier connection member 7, and the fourth carrier C4 is selectively connected to the second sun gear S2 via the second clutch CL2. The power take off member M for taking out the power to the outside is provided at the carrier connection member 7. The fourth ring gear R4 is connected to the first ring gear R1 via a third gear connection member 8 connected to the first gear connection member 5. The input shaft N is connected to the first carrier C1 via the input shaft connection member 3 that extends in the axial direction passing through a radially inner side relative to the first sun gear S1.

Figures 5, 6:
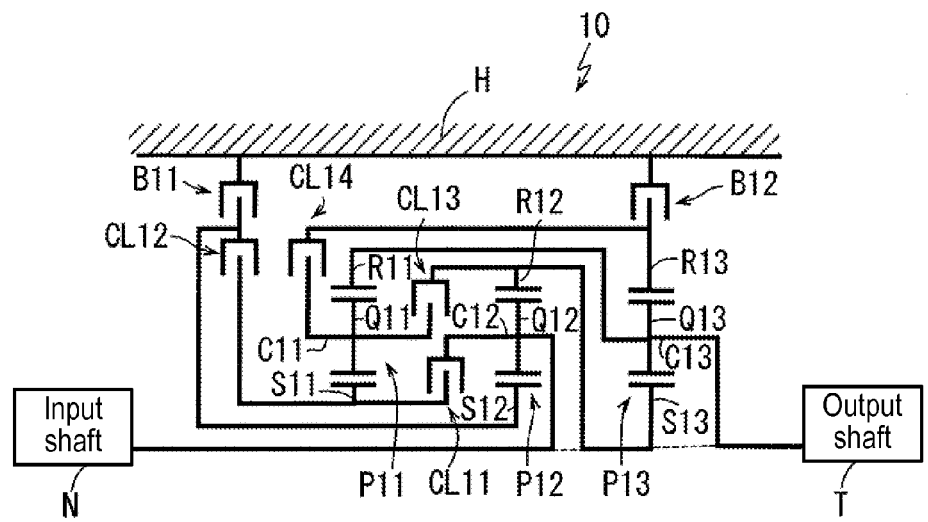
FIG. 5 shows operation states of brakes and clutches at respective speed stages according to the second embodiment disclosed here.
FIG. 6 is a schematic diagram of a known automatic transmission.

According to the automatic transmission 11 for the vehicle according to the second embodiment, as illustrated in FIG. 5, similarly to the automatic transmission 1 of the first embodiment, ten forward speeds and one reverse speed can be established by the restriction of the rotation of the elements of the first to fourth planetary gear mechanisms P1 to P4 by the selective actuation of the first to fourth clutches CL1 to CL4, the brake B1 and the switching clutch D1. Similar effects and advantages to the first embodiment can be attained according to the automatic transmission 11 for the vehicle of the second embodiment.

Particular features of the embodiments can be combined unless it is particularly described otherwise.

According to the embodiment, an automatic transmission for a vehicle includes a housing (H); three single pinion type planetary gear mechanisms including a first planetary gear mechanism (P1) having a first sun gear (S1), a first ring gear (R1), and a first carrier (C1), a second planetary gear mechanism (P2) having a second sun gear (S2), a second ring gear (R2), and a second carrier (C2), and a third planetary gear mechanism (P3) having a third sun gear (S3), a third ring gear (R3), and a third carrier (C3), the first ring gear (R1) and the third sun gear (S3) being connected to each other, the second ring gear (R2) and the third carrier (C3) being connected to each other, said three single pinion type planetary gear mechanisms being supported by the housing (H) and being coaxial to a rotation axis (L); an input shaft (N) supported by the housing (H) to be rotatable about the rotation axis (L), the input shaft (N) connected to the first carrier (C1) of the first planetary gear mechanism (P1); an output shaft (T) supported by the housing (H) to be rotatable about the rotation axis (L), the output shaft (T) connected to the third carrier (C3) of the third planetary gear mechanism (P3); a brake (B1) selectively fixing and releasing the first sun gear (S1) of the first planetary gear mechanism (P1) to and from the housing (H); a first clutch (CL1) selectively connecting the first carrier (C1) and the second sun gear (S2) of the second planetary gear mechanism (P2); a second clutch (CL2) selectively connecting the first sun gear (S1) of the first planetary gear mechanism (P1) and the second sun gear (S2) of the second planetary gear mechanism (P2); a third clutch (CL3) selectively connecting the second carrier (C2) of the second planetary gear mechanism (P2) and the third sun gear (S3) of the third planetary gear mechanism (P3); a fourth clutch (CL4) selectively connecting the third ring gear (R3) of the third planetary gear mechanism (P3) and the second carrier (C2) of the second planetary gear mechanism (P2); and a switching clutch (D1) selectively switching positions to a position where the third ring gear (R3) is fixed to the housing (H), a position where the second carrier (C2) is fixed to the housing (H), or a position where the third ring gear (R3) and the second carrier (C2) are released relative to the housing (H). When establishing a reverse speed, the first clutch (CL1) connects the first carrier (C1) and the second sun gear (S2), and the switching clutch (D1) fixes the second carrier (C2) to the housing (H).

According to the automatic transmission for the vehicle of the embodiment, when establishing a reverse speed stage, the switching clutch (D1) is switched to fix the second carrier (C2), and the first carrier (C1) and the second sun gear (S2) are connected by the first clutch (CL1), thus producing the drive force for the reverse rotation at the second ring gear (R2). The drive force for reverse rotation is outputted to the output shaft (T) via the third carrier (C3). In those circumstances, the first carrier (C1) and the second sun gear (S2) rotate at the input rotation speed because of being connected to the input shaft (N), the second ring gear (R2) and the third carrier (C3) are rotated in a reverse direction by the second planetary gear mechanism (P2), the second carrier (C2) is fixed by the switching clutch (D1), and the first ring gear (R1) and the third sun gear (S3) rotate freely without any restriction by a particular rotation (rotation of particular component). Accordingly, the first sun gear (S1) is not forced to increase the number of rotation (rotation speed).

According to the embodiment, the first planetary gear mechanism (P1), the second planetary gear mechanism (P2), and the third planetary gear mechanism (P3) are disposed in a row in an above-described order from an input shaft side to an output shaft side. The first clutch (CL1) is connected to the second sun gear (S2) via a first portion (U11) of a first-clutch connection member, the first clutch (CL1) selectively connects and releases the first carrier (C1) and the second sun gear (S2) via a second portion (U12) of the first-clutch connection member being connected to the first carrier (C1) at the input shaft side and passing through an inner side relative to the first sun gear (S1) of the first planetary gear mechanism (P1). The first carrier (C1) is connected to an input shaft connection member (3) being connected to the input shaft (N) and passing through an outer side relative to the first ring gear (R1), the first carrier (C1) is connected to the input shaft connection member (3) at the output shaft side, the first carrier (C1) is connected to the second portion (U12) of the first-clutch connection member at the input shaft side. The fourth clutch (CL4) is connected to the third ring gear (R3) via a first portion (U41) of a fourth-clutch connection member being connected to the third ring gear (R3) and passing through an outer side relative to the second ring gear (R2), the fourth clutch (CL4) selectively connecting and releasing the third ring gear (R3) and the second carrier (C2) via a second portion (U42) of the fourth-clutch connection member being connected to the second carrier (C2) at the input shaft side.

The switching clutch (D1) switches positions to a position where the second carrier (C2) is fixed to the housing (H) via a first switching clutch connection member (W1) connected to the second portion (U42) of the fourth-clutch connection member, a position where the third ring gear (R3) is fixed to the housing (H) via a second switching clutch connection member (W2) connected to the first portion (U41) of the fourth-clutch connection member, or a position where the first switching clutch connection member (W1) and the second switching clutch connection member (W2) are released from the housing (H).

According to the embodiment, the automatic transmission includes a fourth planetary gear mechanism (P4) which is a single pinion type planetary gear mechanism, the fourth planetary gear mechanism (P4) rotatably supported by the housing (H) to be coaxial to the rotation axis (L1). The first planetary gear mechanism (P1), the fourth planetary gear mechanism (P4), the second planetary gear mechanism (P2), and the third planetary gear mechanism (P3) are disposed in a row in an above-described order from an input shaft side to an output shaft side. The first carrier (C1) and the fourth carrier (C4) of the fourth planetary gear mechanism (P4) are connected to each other via a carrier shaft connection member (7). The first ring gear (R1) and the fourth ring gear (R4) of the fourth planetary gear mechanism (P4), and the third sun gear (S3) are connected to one another via a gear connection member (8, 5). The first clutch (CL1) connected to the first carrier (C1) and the fourth carrier (C4) via a first portion (U11) of a first-clutch connection member connected to the carrier shaft connection member (7), the first clutch (CL1) selectively connects the second sun gear (S2), and the first carrier (C1) and the fourth carrier (C4) via the first portion (U11) and a second portion (U12) of the first-clutch connection member connected to the second sun gear (S2). The fourth clutch (CL4) is connected to the third ring gear (R3) via a first portion (U41) of a fourth-clutch connection member connected to the third ring gear (R3), and the fourth clutch (CL4) selectively connects the third ring gear (R3) and the second carrier (C2) via the first portion (U41) and a second portion (U42) of the fourth-clutch connection member connected to the second carrier (C2) at the input shaft side. The switching clutch (D1) switches positions to a position where the second carrier is fixed to the housing (H) via a first switching clutch connection member (W1) connected to the second portion (U42) of the fourth-clutch connection member, a position where the third ring gear (R3) is fixed to the housing (H) via a second switching clutch connection member (W2) connected to the first portion (U41) of the fourth-clutch connection member, or a position where the first switching clutch connection member (W1) and the second switching clutch connection member (W2) are released from the housing (H).

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. An automatic transmission for a vehicle, comprising:
a housing;
three single pinion type planetary gear mechanisms including a first planetary gear mechanism having a first sun gear, a first ring gear, and a first carrier, a second planetary gear mechanism having a second sun gear, a second ring gear, and a second carrier, and a third planetary gear mechanism having a third sun gear, a third ring gear, and a third carrier, the first ring gear and the third sun gear being connected to each other, the second ring gear and the third carrier being connected to each other, said three single pinion type planetary gear mechanisms being supported by the housing and being coaxial to a rotation axis;
an input shaft supported by the housing to be rotatable about the rotation axis, the input shaft connected to the first carrier of the first planetary gear mechanism;
an output shaft supported by the housing to be rotatable about the rotation axis, the output shaft connected to the third carrier of the third planetary gear mechanism;
a brake selectively fixing and releasing the first sun gear of the first planetary gear mechanism to and from the housing;
a first clutch selectively connecting the first carrier and the second sun gear of the second planetary gear mechanism;
a second clutch selectively connecting the first sun gear of the first planetary gear mechanism and the second sun gear of the second planetary gear mechanism;
a third clutch selectively connecting the second carrier of the second planetary gear mechanism and the third sun gear of the third planetary gear mechanism;
a fourth clutch selectively connecting the third ring gear of the third planetary gear mechanism and the second carrier of the second planetary gear mechanism; and
a switching clutch selectively switching positions to a position where the third ring gear is fixed to the housing, a position where the second carrier is fixed to the housing, or a position where the third ring gear and the second carrier are released relative to the housing; wherein
when establishing a reverse speed, the first clutch connects the first carrier and the second sun gear, and the switching clutch fixes the second carrier to the housing.
2. The automatic transmission according to claim 1, wherein the first planetary gear mechanism, the second planetary gear mechanism, and the third planetary gear mechanism are disposed in a row in an above-described order from an input shaft side to an output shaft side;
the first clutch is connected to the second sun gear via a first portion of a first-clutch connection member, the first clutch selectively connects and releases the first carrier and the second sun gear via a second portion of the first-clutch connection member being connected to the first carrier at the input shaft side and passing through an inner side relative to the first sun gear of the first planetary gear mechanism;
the first carrier is connected to an input shaft connection member being connected to the input shaft and passing through an outer side relative to the first ring gear, the first carrier is connected to the input shaft connection member at the output shaft side, the first carrier is connected to the second portion of the first-clutch connection member at the input shaft side;
the fourth clutch is connected to the third ring gear via a first portion of a fourth-clutch connection member being connected to the third ring gear and passing through an outer side relative to the second ring gear, the fourth clutch selectively connecting and releasing the third ring gear and the second carrier via a second portion of the fourth-clutch connection member being connected to the second carrier at the input shaft side;

the switching clutch switches positions to a position where the second carrier is fixed to the housing via a first switching clutch connection member connected to the second portion of the fourth-clutch connection member, a position where the third ring gear is fixed to the housing via a second switching clutch connection member connected to the first portion of the fourth-clutch connection member, or a position where the first switching clutch connection member and the second switching clutch connection member are released from the housing.

3. The automatic transmission according to claim 1 further comprising:

a fourth planetary gear mechanism which is a single pinion type planetary gear mechanism, the fourth planetary gear mechanism rotatably supported by the housing to be coaxial to the rotation axis; wherein the first planetary gear mechanism, the fourth planetary gear mechanism, the second planetary gear mechanism, and the third planetary gear mechanism are disposed in a row in an above-described order from an input shaft side to an output shaft side;

the first carrier and the fourth carrier of the fourth planetary gear mechanism are connected to each other via a carrier shaft connection member;

the first ring gear and the fourth ring gear of the fourth planetary gear mechanism, and the third sun gear are connected to one another via a gear connection member;

the first clutch connected to the first carrier and the fourth carrier via a first portion of a first-clutch connection member connected to the carrier shaft connection member, the first clutch selectively connects the second sun gear, and the first carrier and the fourth carrier via the first portion and a second portion of the first-clutch connection member connected to the second sun gear;

the fourth clutch is connected to the third ring gear via a first portion of a fourth-clutch connection member connected to the third ring gear, and the fourth clutch selectively connects the third ring gear and the second carrier via the first portion and a second portion of the fourth-clutch connection member connected to the second carrier at the input shaft side;

the switching clutch switches positions to a position where the second carrier is fixed to the housing via a first switching clutch connection member connected to the second portion of the fourth-clutch connection member, a position where the third ring gear is fixed to the housing via a second switching clutch connection member connected to the first portion of the fourth-clutch connection member, or a position where the first switching clutch connection member and the second switching clutch connection member are released from the housing.

* * * * *